3,352,807
PROCESS OF PREPARING STABLE UNOXIDIZED POLYETHYLENE EMULSIONS
Arthur F. Helin and Gerald J. Mantell, Kansas City, Mo., assignors to Gulf Oil Corporation, Pittsburgh, Pa., a corporation of Pennsylvania
No Drawing. Filed Apr. 19, 1965, Ser. No. 449,265
22 Claims. (Cl. 260—29.6)

This invention relates to polymers and more particularly to aqueous dispersions of polyethylene.

It is known that aqueous emulsions of solid high molecular weight ethylene polymers can be obtained by polymerizing ethylene at elevated temperatures and pressures in an aqueous reaction medium containing an emulsifying agent and an initiator. The resultant emulsions contain high molecular weight polyethylene characterized by sufficiently high degrees of toughness, durability and hardness to adapt them for a variety of uses, as for example, in floor polishing compositions. However, there is a characteristic difference between polyethylene polymerized in emulsion systems and conventional high pressure polyethylene in that the emulsion formed polymers have generally reduced mechanical properties of toughness, durability and hardness, e.g., lower tensile strength, and a much lower elongation at break. This difference appears to be due to a relatively large percentage of low molecular weight polymers formed in the emulsion polymerization system.

Since the mechanical properties are, in general, directly related to molecular weight, attempts heretobefore to upgrade the mechanical properties of these emulsion-formed polymers involved mere modification of the process to obtain higher molecular weight polymers. However, in such emulsions, the particle size of the polymers is also directly related to the molecular weight of the polyethylene, and as a result, the emulsions containing the higher molecular weight polyethylenes are characterized by a correspondingly larger particle size of the polymer. Accordingly, preparation of polyethylene of increased molecular weight for the purpose of obtaining increased toughness, durability and hardness was necessarily accompanied by an increase in particle size with accompanying degradation of certain properties desired for special applications as, for example, loss in gloss and increased haziness in floor polish compositions. Conversely, when the particle size of the emulsion was reduced in order to obtain increased light transmission, as reflected in improved gloss of a polish composition, a loss in molecular weight occurred, resulting in a corresponding loss in toughness and hardness of the polymer. As a result, it was considered necessary to compromise between small particle sizes and high molecular weight.

Although the use of sodium dodecylbenzene sulfonate as an emulsifier in emulsion polymerization systems has been known, it was, however, believed heretofore that if it was used as the sole emulsifier in an ethylene emulsion polymerization process, emulsions would be obtained containing particles over 50 microns in diameter which were not only poorly dispersed, but also unstable to the extent that a clear aqueous layer readily separated. These limitations in the use of sodium dodecylbenzene sulfonate in emulsion polymerization of ethylene are clearly brought out in U.S. Patent No. 2,592,526 which further notes that the properties of the resultant polymer are poor, that the melt viscosity and melting points are high, and that pressed films are brittle and of low tensile strength with little tendency to cold-draw.

Accordingly, it is an object of this invention to provide a new and improved process for preparing polyethylene emulsions directly by the polymerization of ethylene.

It is another object of this invention to provide new and improved emulsions of polyethylene of high molecular weight and of reduced particle size.

Other objects and advantages of this invention will become more apparent from the following description.

In contrast to the prior art processes, it has been discovered, in accordance with this invention, that novel and improved emulsions of substantially unoxidized polyethylene can be directly prepared to contain polyethylene of increased molecular weight and, conjointly, of reduced particle size, by polymerizing ethylene under controlled conditions of temperature and pressure in an aqueous reaction medium containing selected catalysts and an alkylaryl sulfonate as the emulsifier, in which the alkylaryl sulfonate comprises at least 50 weight percent of the emulsifier used and contains at least one alkyl group, containing from about 8 to 18 carbon atoms, attached to the aromatic ring with the alkyl group attached to the ring through a secondary or a tertiary carbon. Typical of these emulsifiers are the sodium salts of ortho or para isomer of 1,1-dimethyldecylbenzene sulfonate, the sodium salt of 1,1-dimethyldecyl diphenyl ether disulfonate, 1-methylundecylbenzene sulfonate, 1,1,3,3,5,5 - hexamethylhexylbenzene sulfonate, 1,1-dimethylhexylbenzene sulfonate, 1-methylheptylbenzene sulfonate, 1,1,3,3-tetramethylbutylbenzene sulfonate, 1,3,5,7 - tetramethyloctylbenzene sulfonate, 1,3,5,7,9,11-hexamethyldodecylbenzene sulfonate, 1,1,3,3,5,5,7,7-octamethyloctylbenzene sulfonate, and 1-mexamethylhexylbenzene sulfonate.

These emulsifiers will have the following structure

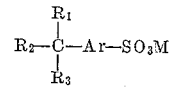

wherein Ar is an aryl group such as phenyl, diphenyl and the like, M is an alkali metal, $R_1$ is a hydrogen or a branched or unbranched aliphatic hydrocarbon radical, and $R_2$ and $R_3$ are branched or unbranched aliphatic hydrocarbon atoms with the total number of carbon atoms in all of the groups, $R_1$, $R_2$, and $R_3$ together being in the range of 7 to 17 and preferably 11.

For convenience the emulsifiers of this invention will be sometimes referred to as "α-C substituted" alkylaryl sulfonates.

In practice, according to this invention, ethylene is polymerized under a pressure extending from about 1550 p.s.i. to about 4500 p.s.i., and preferably in the range of 1550 to 3000 p.s.i., in an aqueous reaction medium containing a water soluble salt of persulfuric acid (as for example ammonium and alkali metal salts) as a catalyst and the aforedescribed α-C substituted alkylaryl sulfonates of this invention to optimize the conjoint properties of molecular weight and particle size of the polymer particles formed, with the process being carried out in a temperature range of about 70 to 95° C. As a result, an emulsion is obtained containing from 17 percent to about 21 percent or more polyethylene solids (based on the weight of the latex) with the latex containing emulsified particles having an inherent viscosity of at least about 0.40 measured as in a 0.2% solution in tetralin at 135° C. and a light transmission of a minimum of at least 40 percent and ranging up to about 90 percent (determined on a sample diluted to 0.06 percent solids), said transmission being determined on a conventional Bausch and Lomb "Spectronic 20" spectrophotometer using distilled water as the 100 percent transmission calibration standard utilizing a wave length of 400 millimicrons.

It was found that although the amounts of materials and operating conditions can be varied slightly as within the ranges indicated above, the particular materials and concentrations used, control of temperatures and the control of pressure are extremely critical in order to obtain a polyethylene emulsion having the properties of this invention.

For example, it was found that use of water soluble alkali metal salts of persulfuric acid (such as ammonium and alkali metal salts) as the initiator for the polymerization are very specific in the success of this invention, and use of other initiators, such as benzoyl peroxide and hydrogen peroxide is excluded from the scope of this invention. Of the alkali metal persulfates employed the potassium salt is preferred, and used in amounts effective to initiate the polymerization, generally in the range of about 0.1 to 0.45 part per 100 parts of water used in the medium (with all amounts indicated hereinafter as parts by weight, unless otherwise specified). Preferably the amount of the persulfate used will be about 0.3 part per 100 parts of the water used.

Similarly, it was found that the selection of $\alpha$-C substituted alkylaryl sulfonates of this invention as the emulsifier was extremely critical in obtaining the emulsions of this invention with and particularly under the above noted control of temperature and pressure. The amount of this emulsifier used may generally extend from about 3 parts per 100 parts of water used for the reaction medium to a maximum of 5 parts per 100 parts of water. However, it is to be noted that the emulsifier, as well as the other components employed in the process, is not normally available in the pure form, but will generally contain impurities and/or various isomers thereof. This is well exemplified in the synthesis of the sulfonate emulsifier, which as a result will normally be a mixture containing sulfonates with isomeric variations in the alkyl moiety. What is important is that the $\alpha$-C substituted alkylaryl sulfonate species be substantially predominant in the emulsifier, and that the isomeric variations thereof in the mixture be present only in minor amounts which do not detract from this invention. Accordingly, the practice of this invention does not preclude the presence of innocuous materials, e.g., innocuous isomeric variants of the emulsifier, and it is only necessary that the $\alpha$-C substituted alkylaryl sulfonate comprise at least 50 weight percent of the emulsifier employed. For some applications, such as in floor polishes, a suitable amount of emulsifier would be such as to provide in the resultant emulsion an emulsifier to polymer ratio of about 0.205.

Although the polymerization of this invention proceeds over a wide pH range of about 2.0 to 12.0, it was found advisable to operate at a constant pH level. A convenient level was a pH of 10–11 and this was maintained by incorporating a small amount of potassium hydroxide in the charge. Generally the amount of potassium hydroxide used will be in a range from about 0.018 to about 0.1 part per 100 parts of water used in the reacting medium.

Optionally, although not required, the access of ethylene to the emulsified growing polymer can be facilitated by the addition of tertiary butyl alcohol. Such addition of tertiary butyl alcohol has been found to assist in the early attainment of equilibrium conditions in the polymerization.

More specifically, the emulsions of this invention will be formed by a continuous process in which polymerization grade ethylene (99.8+percent pure and containing less than about 10–25 p.p.m. $O_2$ is charged to an agitated reactor under a pressure from about 1550 to 4500 p.s.i., and preferably from about 1550 to about 3000 lb./sq. in. The reactor is of conventional high pressure construction, and may be made of a corrosion-resistant material, such as stainless steel or nickel, or lined with a corrosion-resistant material such as stainless steel, glass, or other like linings. The reactor will normally be provided with coils through which water or steam is circulated to control the temperature in the reactor.

Simultaneously with the charge of ethylene, an aqueous polymerization medium is fed continuously to the reactor, with the medium comprising 100 parts of substantially mineral free water, 0.1 to 0.45 part of potassium persulfate, a sodium salt of an $\alpha$-C substituted alkylaryl sulfonate within a range of from about 3 parts to about 5 parts and from about 0.018 to about 0.1 part of potassium hydroxide.

During polymerization, the reactor temperature is generally maintained from about 70 to 90° C. As will be appreciated the specific temperature employed can be and will be selected for the other process variables to provide an optimum product of this invention. The feed rates are adjusted so that a latex is obtained on discharge having a solids content of from about 17 percent to about 21 percent, which will normally require between a 3- and 6-hour residence time. The latex containing some unreacted ethylene is continuously discharged into a defoam or blow-down tank maintained at a pressure of about 5 to 50 p.s.i.g. The unreacted ethylene released from the aqueous medium can be and normally is recycled to the reactor. It was found that ethylene conversions ranged from about 60 percent to about 90 percent per pass.

When operating within the limits of the process variables noted above, the latex product was found to have at least a 17 percent solids content of which the polyethylene component has a minimum inherent viscosity of about 0.40 with the latex having a light transmission of 40 on the "Spectronic" scale. Actually, latex products have been obtained containing between a minimum of 17 to 19 percent solids, having a light transmission ranging from 50 percent up to 65 percent, and an inherent viscosity ranging from 0.41 to 0.48. The pH of the latices obtained ranged from 10 to 12.

If the liquid latex is to be concentrated, as often preferred for convenience in transportation and storage for subsequent use (such as in floor polish formulations) the latex is charged to a conventional concentration unit, such as a falling film evaporator, preferably under suitable vacuum, and a portion of the liquid phase stripped therefrom, generally to a solids content of from about 40 percent to 55 percent. Concentrated latices were obtained having a light transmission ranging from about 56 percent to about 66 percent with a pH between about 2.2 to 3.4, which exemplifies an additional significant advantage of the latices, namely stability in both alkaline and acidic environments, since the latices remain stable throughout the change in pH value of 10 to 12 of the unconcentrated latices to the lower value of 2.2 to 3.4 of the concentrated latices. This is contrasted to prior art latices utilizing anionic emulsifiers such as fatty or rosin acids, and such as sodium alkyl sulfonates which are normally unstable in an acid medium (stable only in an alkaline medium), during either manufacture thereof or during extended shelf storage. However, for convenience in alleviating corrosion problems in storage, such as in metal containers, the pH of these novel concentrated latices is normally adjusted to a value between 4 and 6 for subsequent formulation in a pH environment of the user's preference.

Both the initial latices and the latex concentrates are mechanically stable when subjected to environments of agitation or frictional forces which tend to cause coalescence and the formation of curdy agglomerates in a latex. Mechanical stability was determined by subjecting the latices of this invention to a one minute agitation in a Waring-type blender run at a rate of about 10,000 revolutions per minute.

For purposes of providing a better understanding of the invention, the following specific examples utilizing a commercial product consisting predominantly of 1-methylundecylbenzene sulfonate, as the emulsifier, are given as illustrations of this invention.

Example I

A feed stock was prepared by mixing the following ingredients:

| | Parts |
|---|---|
| Water | 100 |
| Emulsifier, $(C_{10}H_{19})CH(CH_3)C_6H_4SO_3Na$ * | 3 |
| Potassium persulfate | 0.3 |
| Potassium hydroxide | 0.025 |

* An emulsifier commercially available and comprising (about) at least 50 weight percent of an α-C substituted alkyl benzene sulfonate of the structure

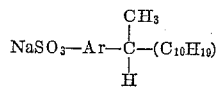

This feed stock was continuously fed at a rate of 2630 pounds per hour to a stirred autoclave maintained at 80° C. which was also charged with ethylene at a pressure of 1800 lbs./sq. in. and at a rate of 710 lbs./hr. The resultant latex was continuously withdrawn, with feeding and discharge rates as correlated, to give a residence time of 3.8 hours.

The latex discharged from the reactor had the following properties:

| | | |
|---|---|---|
| Solids content | percent | 18.1 |
| Inherent viscosity | dl./gm. | 0.47 |
| Light transmission | percent | 42.3 |
| Surface tension | d./cm. | 33.9 |
| pH | | 11.5 |

This latex was then concentrated to a product having the following properties:

| | | |
|---|---|---|
| Solids content | percent | 40.5 |
| Inherent viscosity | dl./gm. | 0.47 |
| Light transmission | percent | 43.5 |
| Surface tension | d./cm. | 33.2 |
| pH | | 3.1 |
| Latex viscosity | cps. | 18 |
| Emulsifier to polymer ratio | | 0.192 |

Example II

An aqueous feed stock, identical to that of Example I, was continuously fed at a rate of 2640 lbs./hr. to a stirred autoclave maintained at 80° C., which was also charged with ethylene at a pressure of 1700 lbs./sq. in. and at a rate of 770 lbs./hr. The resultant latex was continuously withdrawn, with feeding and discharge rates correlated to give a residence time of 3.8 hours. The latex obtained had the following properties:

| | | |
|---|---|---|
| Solids content | percent | 17.9 |
| Inherent viscosity | dl./gm. | 0.43 |
| Light transmission | percent | 42.3 |
| Surface tension | d./cm. | 33.3 |
| pH | | 11.3 |

This latex was concentrated to a product having the following properties:

| | | |
|---|---|---|
| Solids content | percent | 42.0 |
| Inherent viscosity | dl./gm. | 0.43 |
| Light transmission | percent | 42.3 |
| Surface tension | d./cm. | 31.5 |
| pH | | 3.1 |
| Latex viscosity | cps. | 18 |
| Emulsifier to polymer ratio | | 0.192 |

Example III

An aqueous feed stock was prepared from the following ingredients:

| | Parts |
|---|---|
| Water | 100 |
| $(C_{10}H_{19})CH(CH_3)C_6H_4SO_3Na$ | 3.0 |
| Potassium persulfate | 0.3 |
| Potassium hydroxide | 0.020 |

This feed stock was continuously charged at a rate of 2670 lbs./hr. to an agitated reaction vessel maintained at 80° C. which was also charged with ethylene at a pressure of 1700 lbs./sq. in. and at a rate of 725 lbs./hr. The resultant latex obtained after a residence time of 3.8 hrs. had the following properties:

| | | |
|---|---|---|
| Solids content | percent | 17.2 |
| Inherent viscosity | dl./gm. | 0.41 |
| Light transmission | percent | 41.2 |
| Surface tension | d./cm. | 32.0 |
| pH | | 11.0 |

This latex was concentrated into a product of the following properties:

| | | |
|---|---|---|
| Solids content | percent | 40.7 |
| Inherent viscosity | dl./gm. | 0.41 |
| Light transmission | percent | 41.2 |
| pH | | 2.6 |
| Latex viscosity | cps. | 17 |
| Emulsifier to polymer ratio | | 0.192 |

Example IV

An aqueous feed stock was prepared as follows:

| | Parts |
|---|---|
| Water | 100 |
| $(C_{10}H_{19})CH(CH_3)C_6H_4SO_3Na$ | 3.4 |
| Potassium persulfate | 0.3 |
| Potassium hydroxide | 0.020 |

This feed stock was continuously charged at a rate of 2526 lbs./hr. to an agitated autoclave maintained at 80° C., simultaneously with a charge of ethylene under a pressure of 1700 lbs./sq. in. and at a rate of 705 lbs./hr. Polymerization of the mixture at a residence time of about 4.0 hrs. gave a latex having the following properties:

| | | |
|---|---|---|
| Solids content | percent | 18.0 |
| Inherent viscosity | dl./gm. | 0.45 |
| Light transmission | percent | 46.7 |
| Surface tension | d./cm. | 31.8 |
| pH | | 10.0 |

This latex was stripped by evaporation to a latex concentrate having the following properties:

| | | |
|---|---|---|
| Solids content | percent | 41.0 |
| Inherent viscosity | dl./gm. | 0.45 |
| Light transmission | percent | 50.0 |
| Surface tension | d./cm. | 31.6 |
| Latex viscosity | cps. | 17 |
| Emulsifier to polymer ratio | | 0.175 |
| pH | | 2.4 |

Example V

An aqueous feed, identical to that of Example IV was continuously charged at a rate of 2385 lbs./hr. to an agitated vessel maintained at 80° C. simultaneously with a charge of ethylene under a pressure of 1600 lbs./sq. in. and at a rate of 700 lbs./hr. Polymerization at a residence time of about 4.2 hrs. gave a latex having the following properties:

| | | |
|---|---|---|
| Solids content | percent | 17.5 |
| Inherent viscosity | dl./gm. | 0.45 |
| Light transmission | percent | 51.8 |
| Surface tension | d./cm. | 32.5 |
| pH | | 10.0 |

Upon stripping of the latex, a concentrate was obtained as follows:

| | | |
|---|---|---|
| Solids content | percent | 40.9 |
| Inherent viscosity | dl./gm. | 0.45 |
| Light transmission | percent | 53.1 |
| Surface tension | d./cm. | 31.1 |
| Latex viscosity | cps. | 17 |
| Emulsifier to polymer ratio | | 0.175 |
| pH | | 2.3 |

Example VI

An aqueous feed stock was prepared of the following composition:

| | Parts |
|---|---|
| Water | 100 |
| $(C_{10}H_{19})CH(CH_3)C_6H_4SO_3Na$ | 3.6 |
| Potassium persulfate | 0.3 |
| Potassium hydroxide | 0.018 |

This feed stock was continuously charged to an agitated reactor at a rate of 2550 lbs./hr. and maintained at a temperature of 80° C. Simultaneously, the reactor was charged with ethylene under a pressure of 1800 lbs./sq. in. and at a rate of 710 lbs./hr. After polymerization at a residence time of 3.9 hrs., the latex obtained had the following properties:

| | | |
|---|---|---|
| Solids content | percent | 19.0 |
| Inherent viscosity | dl./gm. | 0.48 |
| Light transmission | percent | 44.5 |
| pH | | 10.4 |
| Surface tension | d./cm. | 30.9 |

This latex was concentrated, by stripping of the liquid phase, to a latex concentrate as follows:

| | | |
|---|---|---|
| Solids content | percent | 42.6 |
| Inherent viscosity | dl./gm. | 0.48 |
| Light transmission | percent | 46.7 |
| Surface tension | d./cm. | 30.9 |
| Latex viscosity | cps. | 19 |
| Emulsifier to polymer ratio | | 0.204 |
| pH | | 2.2 |

Example VII

A feed stock, identical to that of Example VI, was charged at a rate of 2630 lbs./hr. into an agitated reactor maintained at a temperature of about 80° C. Simultaneously, the reactor was charged with ethylene under a pressure of 2000 lbs./sq. in. and at a rate of 700 lbs./hr. Polymerization at a residence time of 3.8 hours gave a latex as follows:

| | | |
|---|---|---|
| Solids content | percent | 18.0 |
| Inherent viscosity | dl./gm. | 0.47 |
| Light transmission | percent | 50.5 |
| pH | | 10.4 |
| Surface tension | d./cm. | 31.1 |

Upon concentration of the product, by evaporation of the liquid phase, a latex concentrate was obtained as follows:

| | | |
|---|---|---|
| Inherent viscosity | dl./gm. | 0.47 |
| Light transmission | percent | 49.3 |
| Latex viscosity | cps. | 17 |
| Emulsifier to polymer ratio | | 0.204 |

Example VIII

An aqueous feed stock was prepared from the following ingredients:

| | Parts |
|---|---|
| Water | 100 |
| $(C_{10}H_{19})CH(CH_3)C_6H_4SO_3Na$ | 3 |
| Potassium persulfate | 0.3 |
| Potassium hydroxide | 0.1 |

This aqueous polymerization medium was charged simultaneously with a charge of ethylene to an agitated autoclave maintained at a temperature of 80° C. and a pressure of 1550 p.s.i. The rate of the feeds and the rate of discharged emulsions were adjusted so as to provide, at a residence time of six hours, a latex having the following properties:

| | | |
|---|---|---|
| Solids content | percent | 19.0 |
| Inherent viscosity | dl./gm. | 0.43 |
| Light transmission | percent | 63.0 |
| pH | | 7.4 |
| Particle size | micron | 0.06 |

This latex was concentrated in a wiped film evaporator to a latex concentrate as follows:

| | | |
|---|---|---|
| Solids content | percent | 40 |
| Inherent viscosity | dl./gm. | 0.43 |
| Light transmission | percent | 56.0 |
| pH | | 5.5 |
| Particle size | micron | 0.066 |
| Latex viscosity | cps. | 25 |
| Emulsifier to polymer ratio | | 0.177 |

Example IX

An emulsifier feed stock was prepared by mixing the following ingredients in the proportions indicated as parts by weight:

| | Parts |
|---|---|
| Water | 90 |
| $(C_{10}H_{19})CH(CH_3)C_6H_4SO_3Na$ | 3.5 | and an initiator feed stock was prepared by mixing the following ingredients in the proportions indicated:

| | Parts |
|---|---|
| Water | 10 |
| Potassium persulfate | 0.15 |

The emulsifier feed stock was continuously fed at a rate of 616 grams per hour and the initiator feed stock was continuously fed at a rate of 68 grams per hour, to a stirred autoclave maintained at 85° C. and which was also continuously supplied with ethylene to maintain a pressure of 4500 p.s.i. The resultant latex was continuously withdrawn from the autoclave with the feed and discharge rates adjusted to give a residence time of 3.0 hours.

After seven hours of operation, the reaction was terminated by cooling the charge in the autoclave and stopping the feed thereto. The resultant latex, at the time of shutdown, had the following properties:

| | | |
|---|---|---|
| Solids content | percent | 22.4 |
| pH | | 3.9 |
| Inherent viscosity | dl./gm. | 0.836 |
| Light transmission | percent | 81.1 |
| Surface tension | d./cm. | 57.4 |

Example X

An emulsifier feed stock was prepared by mixing the following ingredients in the proportions indicated as parts by weight:

| | Parts |
|---|---|
| Water | 90 |
| Sodium dodecyldiphenyl ether disulfonate (Commercial Benax 2A1) | 3 | and an initiator feed stock was prepared by mixing the following ingredients in the proportions indicated:

| | Parts |
|---|---|
| Water | 10 |
| Potassium persulfate | 0.15 |

As in the preceding example, the emulsifier and initiator feed stocks were continuously pumped into a stirred autoclave at a rate of 452 grams per hour for the emulsifier feed stock and 48.5 grams per hour. Ethylene was also charged to the autoclave to maintain a pressure of 4000 p.s.i. and the temperature of the total charge was maintained at 85° C. The two feed streams and the discharge streams were adjusted to provide a 4-hour residence time in the autoclave. After 5.75 hours of operation, the run was discontinued and the resultant latex was found to have the following properties:

| | | |
|---|---|---|
| Solids content | percent | 17.2 |
| pH | | 7.4 |

The latex was concentrated, by evaporation, to the following properties:

| | | |
|---|---|---|
| Solids content | percent | 40.0 |
| pH | | 8.5 |
| Surface tension | d./cm. | 57.0 |
| Viscosity | cps. | 16 |
| Light transmission | percent | 90 |
| Inherent viscosity | dl./gm. | 0.74 |

Although the invention has been described with reference to specific materials, embodiments and details, various modifications and changes, within the scope of the invention, will be apparent to one skilled in the art and are contemplated to be embraced within the invention.

What is claimed is:

1. A process of preparing emulsions of polyethylene consisting essentially of polymerizing ethylene under a pressure of about 1550 p.s.i. to about 4500 p.s.i. in an aqueous medium maintained at a temperature from about 70° C. to 90° C. with said medium containing (in weight parts per 100 weight parts of water) a water soluble salt of persulfuric acid in an amount effective to initiate polymerization and from about 3 parts to about 5 parts of an emulsifier comprising at least 50 weight percent of an alkali metal salt of an α-C substituted alkylaryl sulfonate having the structure

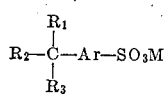

wherein Ar is an aryl group, M is an alkali metal, $R_1$ is selected from the group consisting of hydrogen and aliphatic hydrocarbon radicals, and $R_2$ and $R_3$ are aliphatic hydrocarbon radicals with the total number of carbon atoms in all of the groups $R_1$, $R_2$ and $R_3$ together totalling in number from 7 to 17 said emulsifier being the sole emulsifier in the system.

2. The process of claim 1 wherein said aqueous medium also contains from about 0.018 to 0.1 part of an alkali metal hydroxide and said initiator is an alkali metal persulfate.

3. The process of claim 2 wherein up to 15 parts of said water in said aqueous medium is substituted by tertiary butyl alcohol.

4. The process of claim 1 wherein said α-C substituted alkylaryl sulfonate is the sodium salt of a 1,1-dimethyl-decyl diphenyl ether disulfonate.

5. The process of claim 1 wherein the said α-C substituted alkylaryl sulfonate has the structure

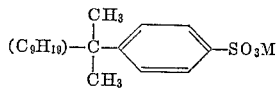

wherein M is an alkali metal.

6. The process of claim 1 wherein said α-C substituted alkylaryl sulfonate has the structure

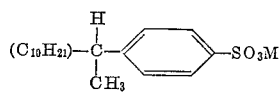

wherein M is an alkali metal.

7. The process of claim 6 wherein said alkali metal is sodium and said initiator is potassium persulfate present in said medium in a range from about 0.1 to about 0.45 part per 100 parts of water, and continuing said polymerization to a total solids content of about 17 percent to about 21 percent in said emulsion.

8. The process of claim 7 including the subsequent step of removing water from the emulsion to increase the total solids content from about 40 percent to about 55 percent.

9. The process of claim 7 wherein said aqueous medium also contains from about 0.018 to about 0.1 part of potassium hydroxide.

10. The process of claim 9 wherein up to 15 parts of said water in said aqueous medium is substituted by tertary butyl alcohol.

11. The process of claim 7 wherein the concentration of said potassium persulfate contained in said aqueous medium is about 0.3 part per 100 parts of water.

12. The process of claim 11 wherein said aqueous medium also contains from about 0.018 to about 0.20 part potassium hydroxide per 100 parts of water.

13. The process of claim 12 wherein up to 15 parts of said water in said aqueous medium is substituted by tertiary butyl alcohol.

14. The process of claim 13 including a subsequent step of removing water from the emulsion to increase the total solids content from about 40 percent to about 55 percent.

15. A process for preparing emulsions of polyethylene consisting essentially of polymerizing ethylene at an elevated pressure in an aqueous medium maintained at elevated temperatures with said medium comprised of water, a water-soluble persulfate polymerization initiator, and an alkylaryl sulfonate compound containing at least one alkyl group attached to the aromatic ring, said alkyl group containing from about 8 to about 18 carbon atoms and with the further provision that the carbon atom of the said alkyl group attached to the aromatic ring is selected from the group consisting of secondary and tertiary carbon atoms.

16. The process of claim 15 wherein the said alkylaryl sulfonate has the structure

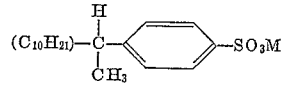

wherein M is an alkali metal.

17. The process of claim 15 wherein the said alkylaryl sulfonate has the structure

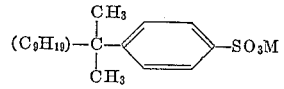

wherein M is an alkali metal.

18. The process of claim 15 wherein the said alkylaryl sulfonate is the sodium salt of 1,1-dimethyldecyldiphenyl ether disulfonate.

19. An aqueous emulsion containing unoxidized polyethylene particles having an inherent viscosity of at least 0.40 with said particles having associated thereon sodium salt of an α-C substituted alkylbenzene sulfonate and a size providing a "Spectronic 20" light transmission reading of at least 40 based on a sample of said emulsion diluted to 0.06 percent solids, with said α-C substituted alkylbenzene sulfonate conforming to the structure

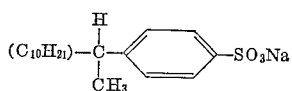

20. An aqueous emulsion containing unoxidized polyethylene particles having an inherent viscosity of at least 0.47 with said particles coated with sodium salt of an α-C substituted alkylbenzene sulfonate and of a size providing a "Spectronic 20" light transmission reading of at least 63 percent based on a sample of said emulsion diluted to 0.06 percent solids, with said α-C substituted alkylbenzene sulfonate conforming to the structure.

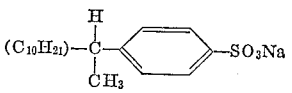

21. An aqueous emulsion containing unoxidized polyethylene particles having an inherent viscosity of at least 0.40 with said particles having associated thereon an emulsifier comprising at least 50 weight percent of an alkali metal salt of an α-C substituted alkylaryl sulfonate having the structure

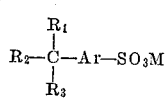

wherein Ar is an aryl group, M is an alkali metal, $R_1$ is selected from the group consisting of hydrogen and aliphatic hydrocarbon radicals, $R_2$ and $R_3$ are aliphatic hydrocarbon radicals with the total number of carbon atoms in all of the groups $R_1$, $R_2$ and $R_3$ together totaling a number from 7 to 17, and said particles having a size providing a "Spectronic 20" light transmission reading of at least 40 based on the sample of said emulsion diluted to 0.06 percent solids.

22. An aqueous emulsion containing unoxidized polyethylene particles having an inherent viscosity of at least 0.40 with said particles having associated thereon an emulsifier consisting essentially of an alkali metal salt of an α-C substituted alkylaryl sulfonate having the structure

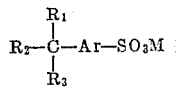

wherein Ar is an aryl group, M is an alkali metal, $R_1$ is selected from the group consisting of hydrogen and aliphatic hydrocarbon radicals, and $R_2$ and $R_3$ are aliphatic hydrocarbon radicals with the total number of carbon atoms in all of the groups $R_1$, $R_2$ and $R_3$ together totaling a number from 7 to 17, and said particles having a size providing a "Spectronic 20" light transmission reading of at least 40 based on the sample of said emulsion diluted to 0.06 percent solids.

References Cited
UNITED STATES PATENTS

| | | | |
|---|---|---|---|
| 2,449,489 | 4/1948 | Larson | 260—29.6 |
| 2,592,526 | 4/1952 | Seed | 260—92.6 |
| 3,226,352 | 12/1965 | Helin et al. | 260—29.6 |
| 3,244,652 | 4/1966 | Helin et al. | 260—29.6 |

SAMUEL H. BLECH, *Primary Examiner.*

MURRAY TILLMAN, *Examiner.*

J. WHITE, *Assistant Examiner.*